UNITED STATES PATENT OFFICE.

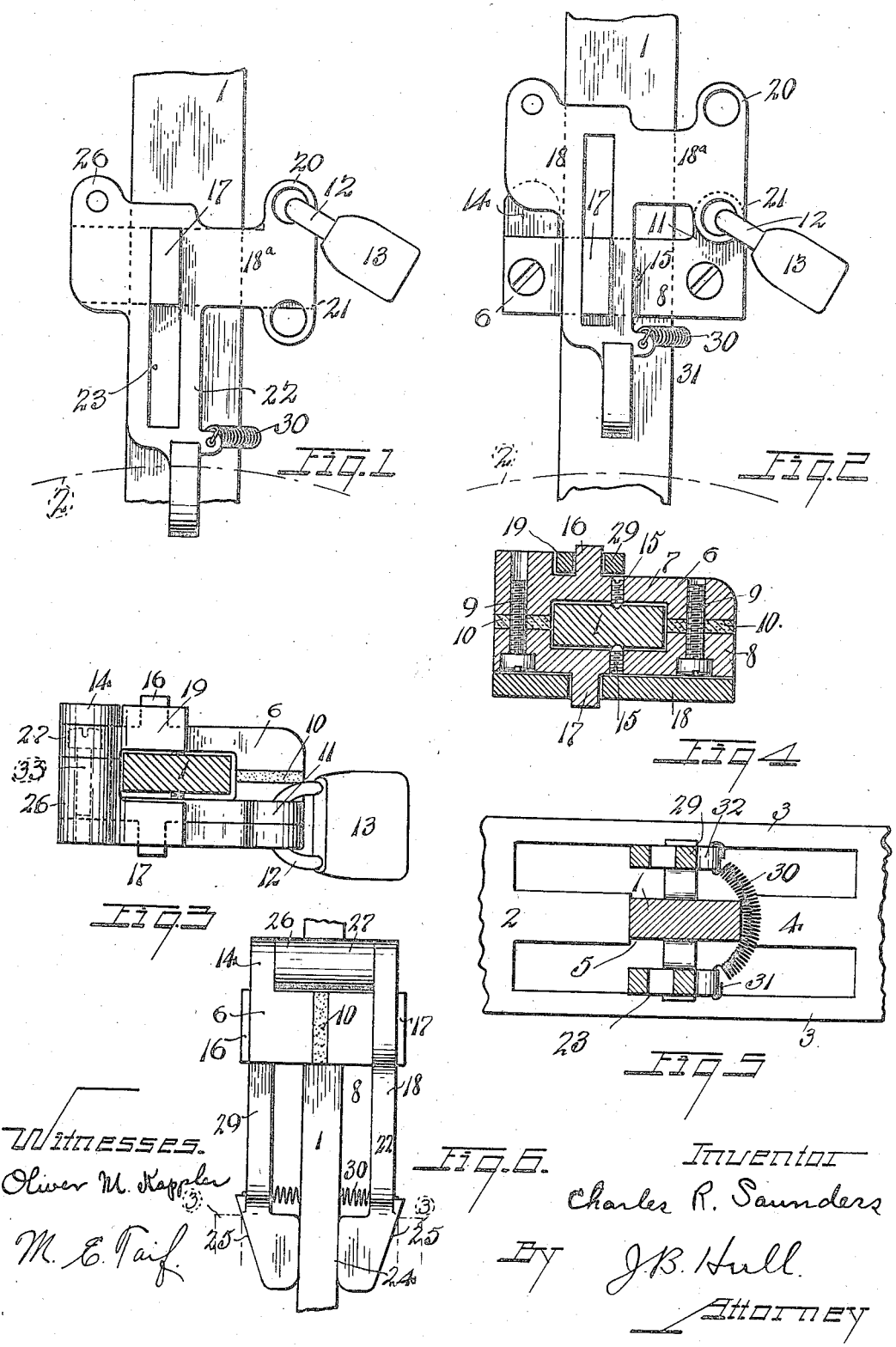

CHARLES R. SAUNDERS, OF CLEVELAND, OHIO.

AUTOMOBILE-LOCK.

1,138,796. Specification of Letters Patent. Patented May 11, 1915.

Application filed August 9, 1910. Serial No. 576,310.

*To all whom it may concern:*

Be it known that I, CHARLES R. SAUNDERS, a citizen of the United States, residing at Cleveland, in the county of Cuyahoga and State of Ohio, have invented a certain new and useful Improvement in Automobile-Locks, of which the following is a full, clear, and exact description, reference being had to the accompanying drawings.

This invention relates to locking devices for use with motor vehicles, and more especially to a device which may be conveniently applied to and carried by the operating lever and which is adapted to coöperate with the "gate" or guide frame, when the lever is in "dead" position in said gate or frame, to prevent further movement of said lever.

The general objects of the invention are to provide a lock of this kind which is economical of production, efficient in operation, and which is particularly well adapted for use with different makes of automobiles.

Still further and generally speaking, the invention may be defined as consisting of the combinations of elements and parts embodied in the claims hereto annexed and illustrated in the drawings forming part hereof, wherein—

Figure 1 represents a side elevation of the gate or guide frame and locking lever, the latter having my lock device applied thereto, the locking device proper being in its lowered or operative position; Fig. 2 represents a similar view showing the locking device in its elevated or inoperative position; Fig. 3 represents a top plan view of the lock, the lever being shown in section; Fig. 4 represents a transverse sectional view taken through the lock and the lever; Fig. 5 is a transverse sectional view taken through the lock and lever just above the guide frame, the latter being shown in elevation; and Fig. 6 shows an end elevation of the lock.

Describing the various parts by reference characters, 1 denotes the operating lever of the vehicle and 2 the guide frame, "quadrant" or "gate", within which the lever operates. This frame is of the usual construction and comprises a pair of side members 3 and an intermediate member 4, a slot being provided between each side member and the intermediate member and the intermediate member being provided with a transverse slot 5 permitting the lever to be shifted from one side of the intermediate member to the other.

The lock shown herein is carried by the lever and comprises a base member which is rigidly secured to the lever and a vertically reciprocable locking device which is carried by the base, the lower ends of the said device being adapted, when the device is in lowered position, to engage the side members 3 of the frame or gate, to prevent any lateral movement of the lever in the slot 5.

The base member is indicated at 6 and is shown as consisting of a pair of U-shaped sections 7 and 8, said sections being united by means of screws 9 having their heads counter-sunk in one of said sections and their ends threaded into bores provided in the opposite section. Suitable spacing material 10 may be inserted between the two sections. One of the sections 8 is provided at one end with an upwardly extending lug 11 provided with an aperture for the reception of the bow 12 of a padlock 13. The other section is provided at its opposite end with an upwardly extending lug or projection 14, for a purpose to be described. The sections 7 and 8 are rigidly secured to the lever 1, as by means of screws 15 threaded into apertures provided in the members 7 and 8 and engaging suitable recesses in the opposite sides of the lever 1. Each of the members 7 and 8 is provided with an outwardly projecting guide lug 16, 17, respectively.

The locking device which is carried by the base just described comprises a pair of depending locking members mounted on said base and provided with slots for the reception of the guide lugs 16 and 17 and having means coöperating with the base whereby it may be retained in lowered or operative position or in elevated or inoperative position. The locking device comprises preferably a pair of sections 18 and 19. The section 18 comprises a side plate 18ᵃ which is substantially co-extensive in width with the base section 8. This plate is provided with an upper lug 20 and a lower lug 21, each of said lugs being provided with a perforation adapted to receive the bow of the padlock. Depending from the plate 19 is a leg 22, said leg being provided with an elongated vertical slot 23. The lower end of the leg is provided with inwardly and outwardly projecting inclines, the inclines extending upwardly from the lower end of said leg and being shown at 24 and 25. The inclined surface 25 is of considerable extent, and the purpose of this outwardly extending incline is to accommodate the locking device to a considerable range of variation of width of the gates or guide frames on which it may be used, while the upper end of the inwardly projecting incline is adapted to engage the adjacent side of the lever. The section 18 is provided at its upper end and opposite the lug 20 with an internally threaded lug 26 coöperating with a similar lug 27 carried by the opposite section 19 of the locking device. This section is not provided with an extended plate similar to the plate 18ª but is provided with a leg 29 similar to the leg 22 having a similar vertical slot therein for the reception of the guide lug 16 and provided at its lower end with the inclined surfaces 24, 25. The lower ends of the legs of the two sections are substantially identical, the two inclined surfaces 25 being adapted to engage the outer frame members and the inwardly extending projections at the lower ends of the legs being adapted to engage the opposite sides of the lever. In order to avoid rattling, the legs are connected by means of a short spiral spring 30, said spring being connected to lugs 31 and 32 projecting from said legs.

With the construction as described, the operation of the device will be apparent. When it is desired to drive the vehicle, the locking device will be elevated, as shown in Fig. 2, and may be conveniently retained in such elevated position by inserting the bow of the padlock through the aperture in the lower lug 21 and the aperture provided in the lug 11 carried by the plate 8. The locking device will then be retained with the lower ends of its legs a sufficient distance above the gate to clear the same and not interfere with the operation of the lever. When it is desired to lock the lever in its "dead" or inoperative position, the lever is inserted into the slot 5, the bow of the padlock withdrawn from the aperture in the lug 21, permitting the locking device to drop to the position shown in Fig. 1, the said device being supported by the lugs 16 and 17. In this position, the lower ends of the legs 22 and 29 enter the spaces provided on opposite sides of the intermediate portion 4 of the gate or frame. The inclined faces 25 bear against the side members 3 and the upper ends of the incline 24 preferably abut against the opposed faces of the lever. The inclined faces 25 allow for a considerable variation in the width of the slots in different gates or frames, while insuring an engagement between such inclined faces and the outer members 3. In applying the lock to the lever, the base will be applied thereto in such position that, when the lower ends of the legs of the locking device are in the spaces between the intermediate side members of the gate and the inclined faces 25 engage the side members 3, the bow of the padlock may be inserted through the aperture in the upper lug 20 of the side plate 19 and through the aperture in the lug 11, thus retaining the locking device in position and preventing any movement of the lever.

It will be noted that, when the locking device is in its lowered position, the plate 18 will cover the heads of the screws 9 and that the lug 14 will cover the head of the screw 33 which connects the lugs 26, 27 provided at the upper ends of the lock sections. When the locking device is in operative position, it therefore follows that it is practically impossible to take it apart and thus permit the operation of the lever.

The foregoing lock is comparatively simple of construction, is practically universal in application, and may be applied to existing levers with no change in the construction thereof.

Having thus described my invention, what I claim is:

1. In a device of the character set forth, the combination of a base or support having means whereby it may be secured to a lever, a locking device carried by and slidable along said lever past said base or support and means for securing said locking device to said base or support when in its operative or engaging position, said locking device when in such engaging position serving to cover and prevent access to said securing means.

2. In a device of the character set forth, the combination of a base or support having means whereby it may be secured to a lever, a locking device sleeved on said base or support slidable thereon along said lever, and means for securing said device to the base or support when in its operative and inoperative position, said device when in operative position serving to cover and prevent access to said securing means.

3. The combination, with a guide frame or gate comprising side members and an intermediate slotted member, of an operating lever, a lock carried by said lever and comprising a base or support attached to said lever and a forked locking device reciprocably mounted on said base or support, the lower ends of the forks being adapted to enter the spaces on opposite sides of the intermediate member when said lever is located in the slots thereof, and to engage the inner faces of said side members whereby the lateral movement of said lever is prevented, and means for locking said devices in place with its forks in such spaces.

4. The combination, with a guide frame or gate comprising a pair of side members and an intermediate slotted member, of an operating lever in said frame, and a lock carried by said lever, said lock comprising a base or support secured to the lever, and means movable with respect to said base or support adapted to engage inner faces of the side members to prevent lateral movement of the lever.

5. A device of the character set forth, comprising a substantially U-shaped base, said base comprising a pair of opposed sections, screws connecting said sections, and a vertically reciprocable locking device mounted on said base, said locking device being provided with a plate adapted to cover said screws when the locking device is in its operative or locking position.

6. In a device of the character set forth, the combination of a base or support having lateral guide projections, a locking device reciprocably mounted on said base or support and comprising a pair of vertically slotted legs, the slots of which receive said projections, and means for securing said locking device against vertical movement.

7. In a device of the character set forth, the combination, with a guide frame or gate and a lever movable therein, said frame comprising a pair of parallel side members and an intermediate member, there being a slot between each of said side members and said intermediate member of sufficient width to permit said lever to swing therein and said intermediate member being formed with a passageway to permit said lever to be shifted therethrough; of a base having means whereby it may be applied to said lever, a locking device reciprocably mounted on said base and comprising a pair of legs lying adjacent to and parallel with the side of said lever and each leg having its lower end provided with an upwardly and outwardly extending incline adapted to engage the outer faces of said side blocks when said lever is in the passageway, and means whereby said locking device may be secured in operative or locking position.

8. In a device of the character set forth, the combination with a lever and its guide frame or sector, of a base or support secured to said lever and having a perforated lug or projection, a locking device reciprocably mounted on said base or support and having a pair of longitudinally spaced perforated ears, one of said ears being adapted to register with said lug when said locking device is in operative engagement with said guide frame or sector, and the other ear being adapted to register with said lug when said device is moved out of such engagement, and a lock for securing either of the ears of the locking device to the lug of the base or support.

9. In a device of the character set forth, the combination, with a lever and its guide frame, said guide frame having a pair of parallel slots connected by a passageway, of a base or support having means for securing the same to said lever, a reciprocable locking device mounted on said base or support and having a pair of depending legs adapted to enter the side slots of said guide frame, and a coiled spring connecting said legs and passing around said lever.

10. As an article of manufacture, a base or support having means whereby it may be attached to a lever, a reciprocable locking device mounted on said base or support and having a forwardly extending leg at each side of said lever adapted when advanced to engage a guide frame or sector in which said lever swings, means for securing said locking device in such advanced position so as to prevent an unauthorized movement of said lever, and a spring connecting said legs preventing rattling thereof.

11. A lock for automobiles comprising in combination with a stationary quadrant and a lever movable relative thereto, of a plate having guides at the sides thereof secured on said lever, a bolt covering said plate and slidable thereover and covering its securing means, and locking means adapted to engage said bolt and plate whereby said bolt may be secured in the retracted or the extended position, substantially as described.

12. In a lever locking device, a lever guiding segment having a longitudinal slot through which said lever is adapted to move, and a transverse slot portion, a bolt element mounted on said lever to reciprocate into and out of engagement with said segment, said bolt element having inclined wedging faces to contact with the extremities of said transverse slot portion whereby said lever is held in said transverse slot portion and a locking means to secure said bolt element in segment engaging position.

13. In a lever locking device, a segment having an H-shaped slot within which a lever is movably confined, a bolt element reciprocably mounted on said lever, said bolt element having sloping wedging surfaces adapted to be forced into wedging contact with the walls of said H-slot adjacent the cross arm portion of said H-slot to lock said lever immovably in said cross arm portion, and locking means to secure said bolt element immovably relative to the lever.

14. In a lever lock, a lever movable through a segment, a bolt element reciprocably and permanently mounted on said lever, having a tapering nose adapted to guide said bolt into the slot of said segment and wedgingly engage therewith and a locking mechanism to secure said bolt relative to the lever.

15. In a lever lock, a lever movable through a segment, a bolt element reciprocably attached to and mounted on said lever having a pair of tapering noses located on opposite sides of said lever adapted to guide said bolt into the slot of said segment and wedgingly engage therewith, and a locking mechanism to secure said bolt relative to said lever.

16. A lock for automobiles comprising in combination with a stationary quadrant and a lever movable relative thereto, of a plate having guides at the sides thereof secured on said lever, a bolt covering said plate and slidable thereover and covering its securing means, and a locking member adapted to secure the bolt in the retracted or the extended position, substantially as described.

17. A lock for automobiles comprising in combination with a stationary frame and a lever movable relative thereto, of a foundation member having guides thereon secured on said lever, a bolt covering said plate and slidable thereover and covering its securing means, an end on said bolt for locking engagement with said frame, and means to secure the bolt in the retracted or the extended position, substantially as described.

In testimony whereof, I hereunto affix my signature in the presence of two witnesses.

CHARLES R. SAUNDERS.

Witnesses:
J. B. HULL,
BRENNAN B. WEST.